(12) United States Patent
Morrison

(10) Patent No.: US 7,726,371 B2
(45) Date of Patent: Jun. 1, 2010

(54) HIGH-EFFICIENCY WHEEL PRODUCT

(76) Inventor: Glenn A. Morrison, 3141 N. 17120 E. Rd., Momence, IL (US) 60954

( * ) Notice: Subject to any disclaimer, the term of this patent is extended or adjusted under 35 U.S.C. 154(b) by 587 days.

(21) Appl. No.: 11/769,566

(22) Filed: Jun. 27, 2007

(65) Prior Publication Data

US 2009/0000715 A1   Jan. 1, 2009

(51) Int. Cl.
*B60C 5/00* (2006.01)
*B60C 5/20* (2006.01)
*B60C 5/22* (2006.01)
*B60B 19/00* (2006.01)

(52) U.S. Cl. ............... 152/331.1; 152/450; 152/339.1; 301/5.1

(58) Field of Classification Search ............ 152/340.1, 152/5.1, 38.1, 39.1, 40.3; 301/40.4
See application file for complete search history.

(56) References Cited

U.S. PATENT DOCUMENTS

| | | | |
|---|---|---|---|
| 580,884 A | 4/1897 | Murphy | |
| 1,585,837 A | 5/1926 | Eiker | |
| 2,127,075 A | 8/1938 | Venosta | |
| 2,164,686 A | 7/1939 | McDevitt | |
| 2,445,503 A | 7/1948 | Williams | |
| 2,572,594 A | 10/1951 | Bushemi | |
| 4,293,017 A | 10/1981 | Lambe | |
| 4,922,981 A | 5/1990 | Pompier | |
| 5,067,932 A | 11/1991 | Edwards | |
| 5,109,905 A | 5/1992 | Lambe | |
| 5,236,055 A | 8/1993 | Legal | |
| 5,885,383 A | 3/1999 | French | |
| 6,470,935 B1 * | 10/2002 | Fulsang | 152/339.1 |
| 6,516,845 B2 * | 2/2003 | Nguyen et al. | 152/158 |
| 7,100,654 B2 | 9/2006 | Boiocchi et al. | |

FOREIGN PATENT DOCUMENTS

| | | | |
|---|---|---|---|
| GB | 2299554 | * | 10/1996 |
| JP | 8-282208 | * | 10/1996 |

* cited by examiner

*Primary Examiner*—Justin Fischer
(74) *Attorney, Agent, or Firm*—Sabre Technical Services Corp.; David J. Bremer

(57) ABSTRACT

The invention is a high-efficiency wheel product for use with various ground vehicles. The product is designed to provide rolling support to the vehicle and to accommodate various surface conditions, for example, smooth pavement, rough pavement, potholes, dirt roads, and other conditions. The wheel product includes a multi-chambered pneumatic tire designed to minimize energy loss between the tire and a rolling surface by substantially reducing tire flex, a main source of energy loss in ground vehicles. Additionally, the product can reduce the need for conventional drive train elements such as shock absorbers.

16 Claims, 6 Drawing Sheets

HIGH-EFFICIENCY WHEEL PRODUCT

The invention is an energy efficient wheel product for use with various ground vehicles. The product is designed to provide rolling support to the vehicle and to accommodate various surface conditions, for example, smooth pavement, rough pavement, potholes, dirt roads, and other conditions.

The wheel product includes a multi-chambered pneumatic tire designed to minimize energy loss between the tire and a rolling surface and to reduce the need for conventional drive train elements such as shock absorbers.

A conventional pneumatic tire under load deforms to reduce a pressurized volume, thereby raising internal air pressure. When the internal air pressure is sufficient to balance the load, the vehicle is supported substantially by the air pressure, providing a flexible cushion between the vehicle and the rolling surface that absorbs shock and provides a comfortable ride. However, a conventional tire expends significant energy, mostly in the form of wasted heat, as it deforms while rolling over the surface.

The multi-chambered pneumatic tire utilizes a high-pressure chamber, and inventive internal restraints that position the chamber, to approximate a solid tire when rolling on smooth surfaces. On smooth surfaces, the multi-chambered tire exhibits minimal energy loss due to tire flex. Over rough surfaces, the multi-chambered tire performs similarly to a conventional tire to provide additional cushioning needed for a comfortable ride.

DRAWINGS

DETAILED DESCRIPTION

The invention is an energy efficient wheel product. The product can be used on ground vehicles, including but not limited to automobiles, all-terrain vehicles, trailers, and various other rolling vehicles.

The wheel product includes a multi-chambered pneumatic tire fixed to a wheel hub. The multi-chambered tire can replace a conventional tire mounted to a wheel and can substitute for a conventional tire.

The multi-chambered tire rotates with the wheel hub about a wheel axis. The tire encircles the wheel hub and, in use, supports the wheel hub in spaced-apart relation from a rolling surface, for example from a roadway surface.

Figure 1:
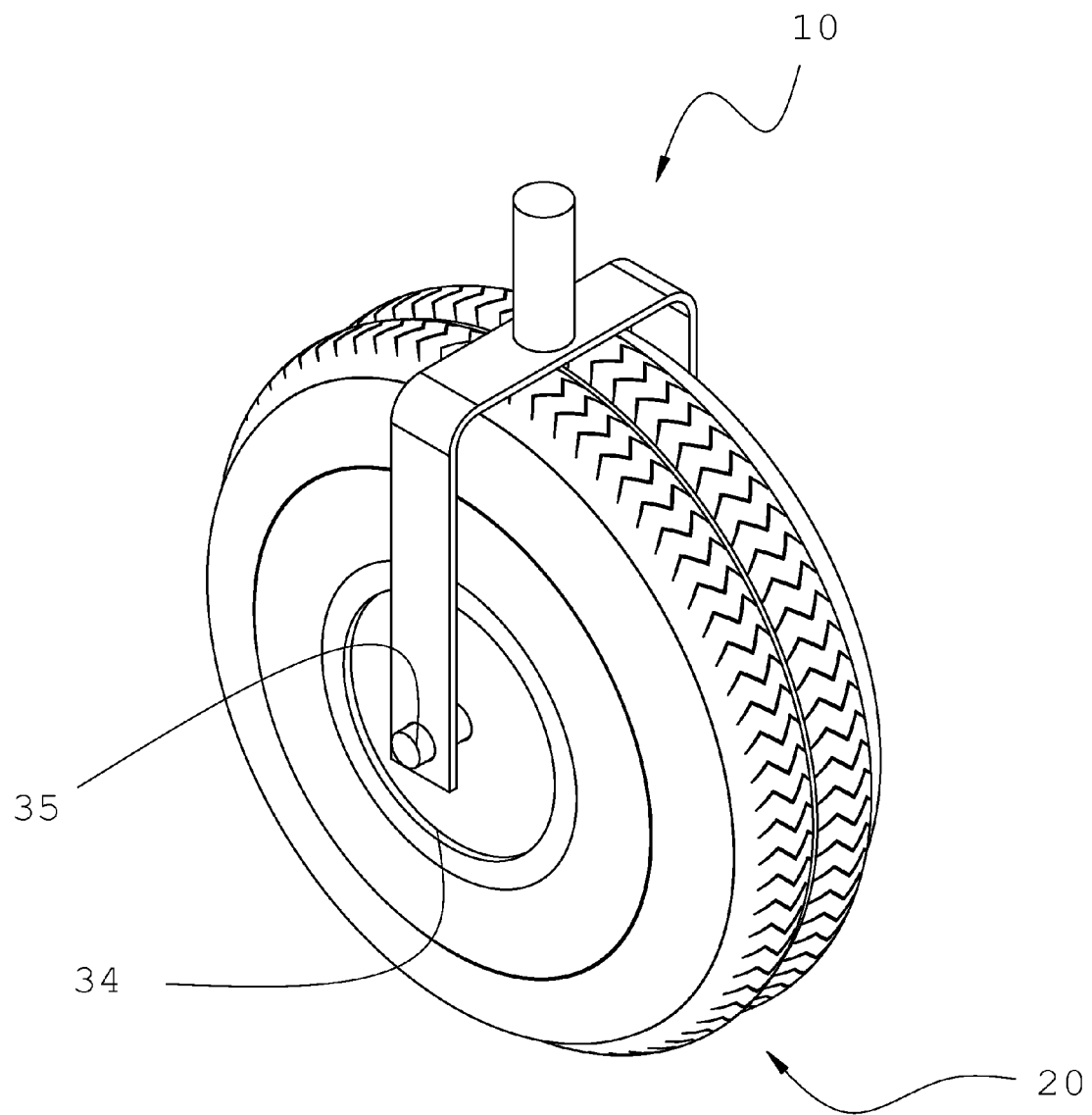
FIG. 1 is a perspective view of an embodiment of the invention.
Figure 2:
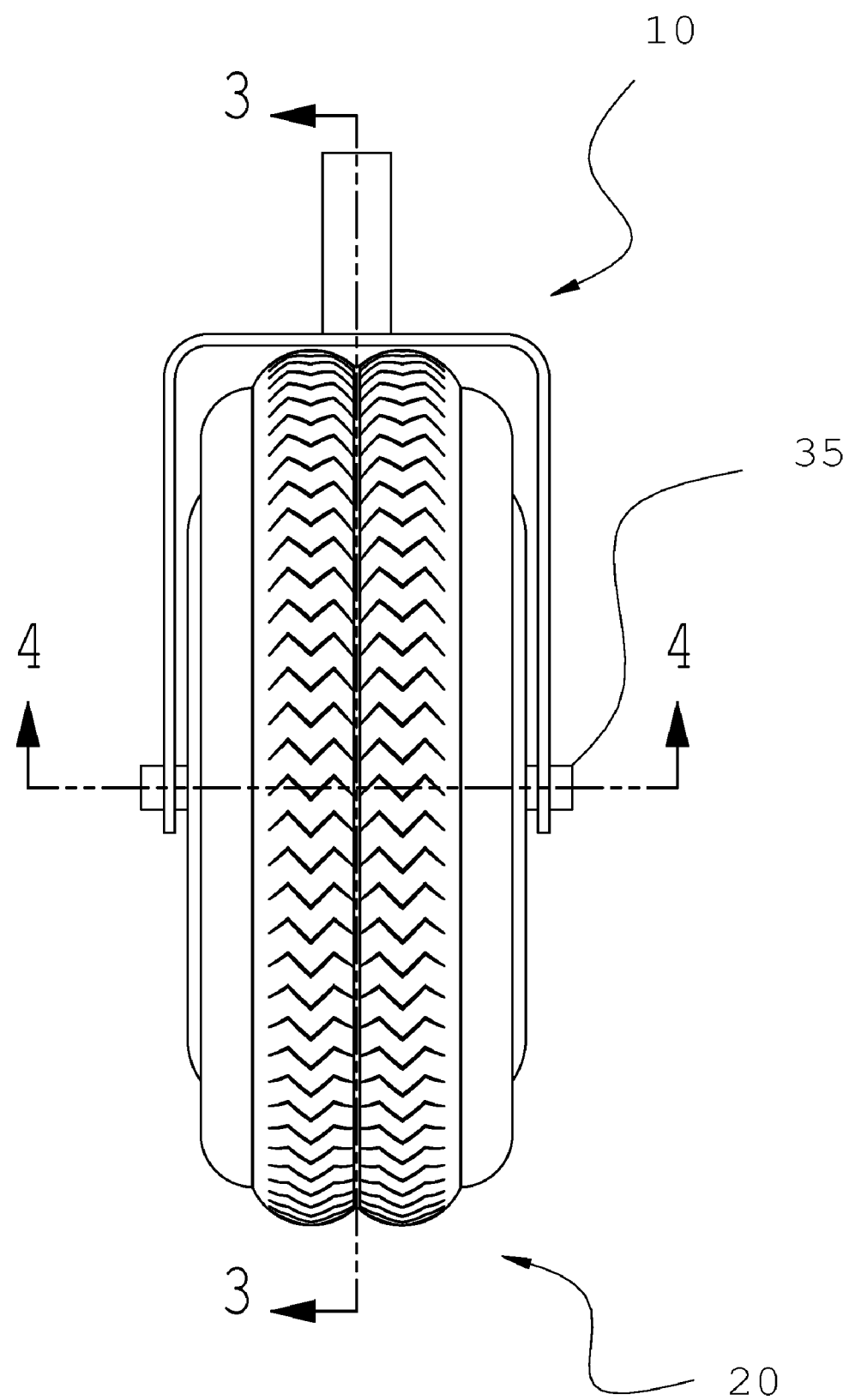
FIG. 2 is a front view of the embodiment.
Figure 3:
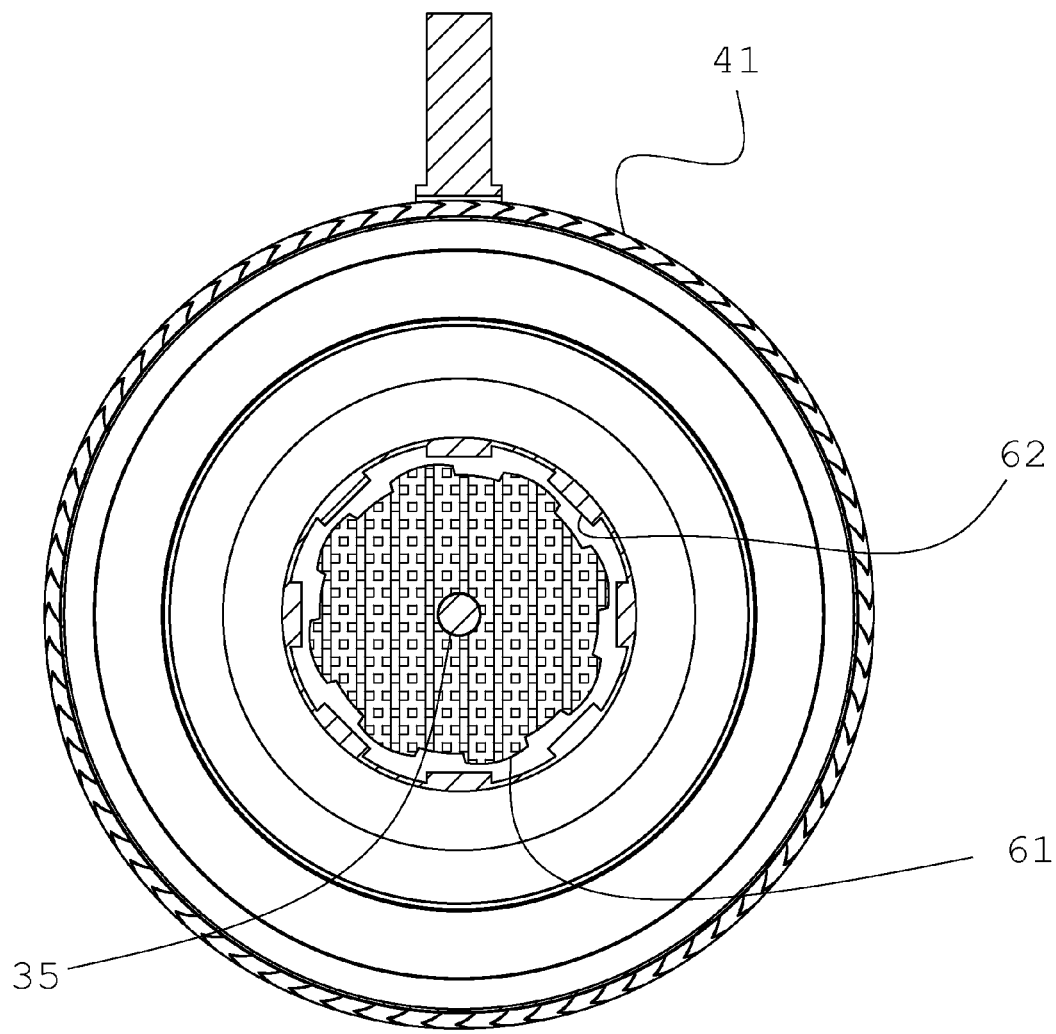
FIG. 3 is a section view along line 3-3 of the embodiment.
Figure 4:
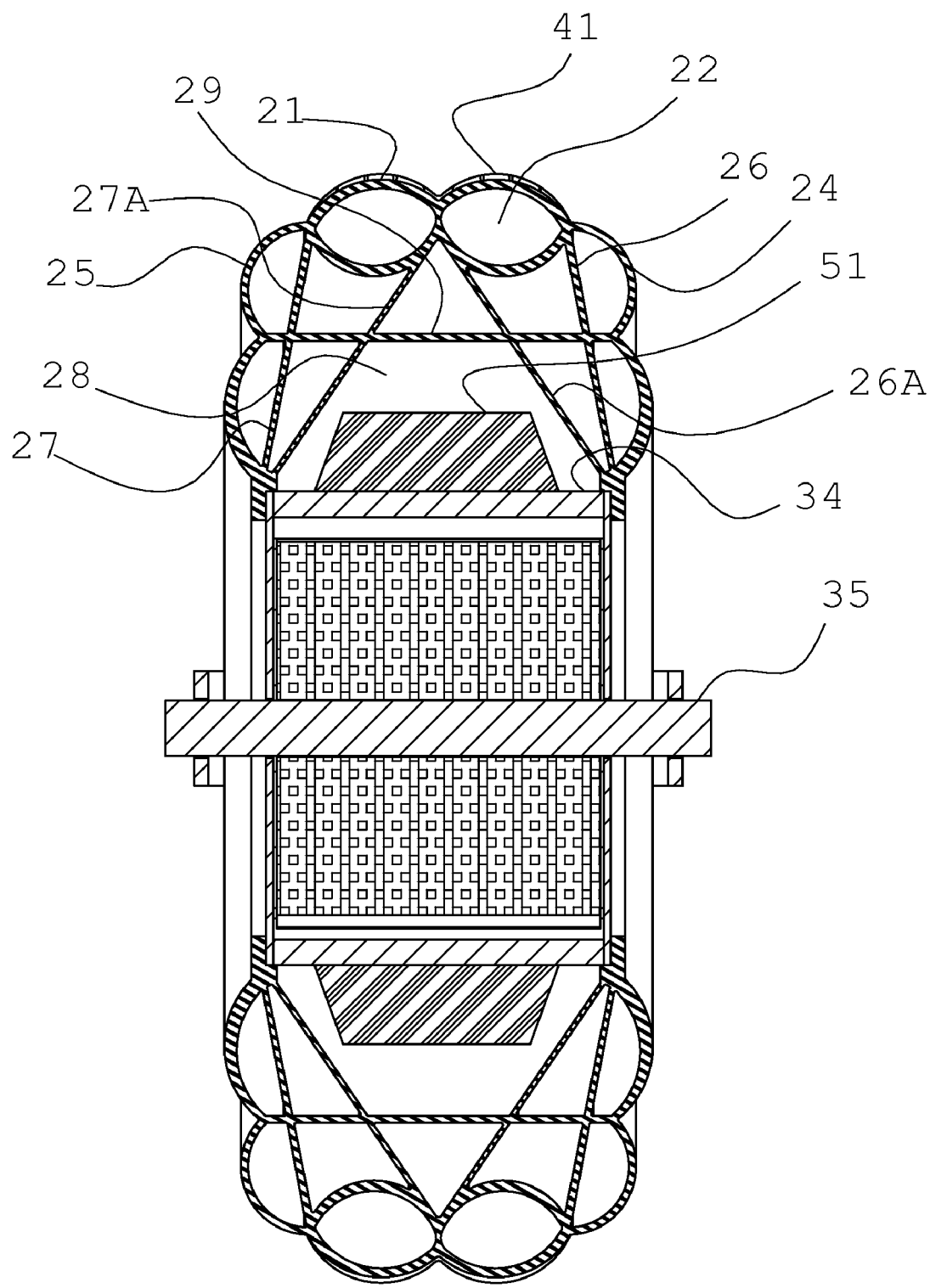
FIG. 4 is a section view along line 4-4 of the embodiment.
Figure 5:
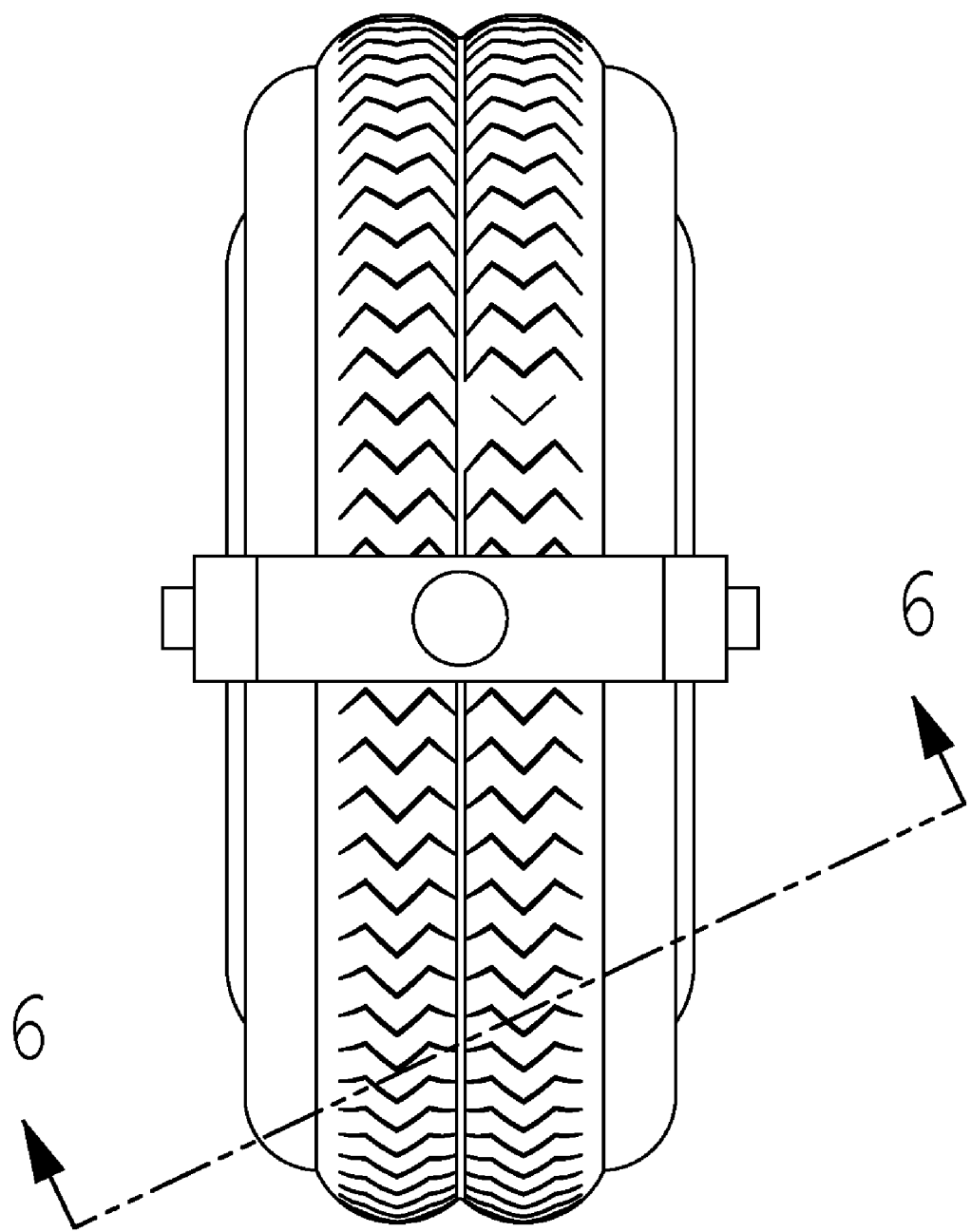
FIG. 5 is a top view of the embodiment.
Figure 6:
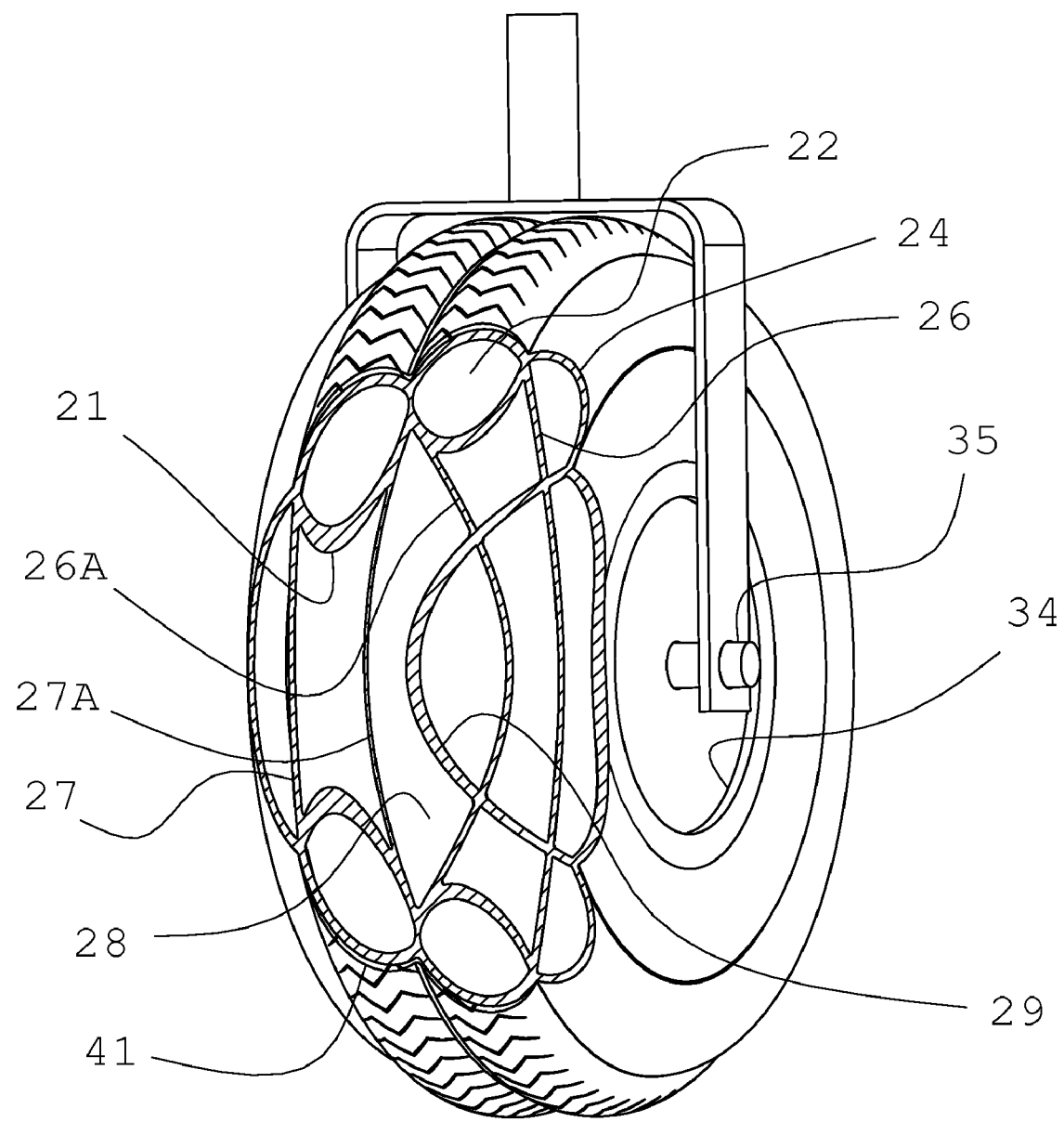
FIG. 6 is a section view along line 6-6 of the embodiment.

As shown in FIG. 1-6, the wheel product 10 includes the multi-chambered pneumatic tire 20. The tire 20 encircles the wheel hub 34 for rotation around the wheel axis 35.

The tire has an non-porous outer ring. The outer ring encircles the wheel hub and is radially spaced apart from the wheel hub. The outer ring, in use, can contact the rolling surface.

The outer ring is connected to the wheel hub via a first non-porous sidewall and via a second non-porous sidewall. The sidewalls are each fixed to the wheel hub and each encircles the wheel hub. The sidewalls are axially spaced apart and each extends radially outwards from the wheel hub to connect to the outer ring.

The sidewalls and the outer ring are non-porous as required to maintain elevated pressures within the tire.

The outer ring is anchored to the first sidewall and to the second sidewall via a first porous ring restraint band and a second porous ring restraint band, respectively. The ring restraint bands connect to the sidewalls proximal the wheel hub.

The ring restraint bands position the outer ring substantially concentrically to the wheel hub and limit ring axial movement along the wheel hub. The tire can include additional ring restraint bands.

The outer ring comprises at least one high-pressure chamber that is pressurized with gas, for example with air. The high-pressure chamber forms a continuous, hollow chamber around the wheel hub. The high-pressure chamber, when pressurized, biases the outer ring to form a smoothly curving surface encircling the wheel hub.

The high-pressure chamber, in use and pressurized, can be substantially toroidally shaped. "Toriodal" and "torus", as used here and throughout, include elliptic tori and various similar shapes as well as circular tori.

The optimally pressurized high-pressure chamber stiffens the outer ring and helps hold the ring in a ring-like shape when under load. In addition, the stiffened ring minimizes rolling resistance by reducing tire flexing as the wheel product rolls along the surface.

In some embodiments, the high-pressure chamber can be filled with synthetic foam.

In FIG. 1-6, the tire 20 has an outer ring 21 encircling the wheel hub 34. The ring 21 is connected to the wheel hub 34 by a first sidewall 24 and by a second sidewall 25. The outer ring 21 is positioned with respect to the wheel hub by the first ring restraint band 26 and the second ring restraint band 27. The outer ring 21 is further positioned by the additional ring restraint bands 26A and 27A, respectively.

The outer ring 21 comprises two high-pressure chambers, for example the high-pressure chamber 22. The chamber 22 is substantially toriodal.

In use and rolling on a smooth surface, the stiffened outer ring and the ring restraint bands work together to suspend the wheel hub so that the hub is positioned substantially concentrically within the ring and spaced apart from the surface.

Under load, the stiff outer ring resists deflecting from the ring-like shape and the ring restraint bands hold the outer ring in position around the wheel hub. In combination, the outer ring and the ring restraint bands can approximate a solid wheel and therefore minimize energy loss as the vehicle rolls on the smooth surface.

The porous ring restraint bands are strong, flexible, and substantially inelastic. The ring restraint bands minimally elongate so that the bands can significantly limit ring movement radially away from the hub and axially along the hub. Under load, the stiff outer ring contacts the rolling surface and the load biases the hub to move within the outer ring toward the surface. At least part of the inelastic restraint band becomes tensioned between the hub and the outer ring and positions the hub substantially concentrically within the ring.

The ring restraint bands are porous to prevent pressure gradients across each ring restraint band. Except for transient pressure gradients, ring restraint band porosity ensures substantially equal pressure across the ring restraint bands.

The tire can have one or more additional ring restraint bands. A ring restraint band can intersect another ring restraint band. Ring restraint bands can be connected via various means and methods including, but not limited to, sewing, adhesive bonding, thermal welding, and others. Multiple ring restraint bands can be unitarily formed together.

The tire has a low-pressure chamber bounded by the hub, the outer ring, and the sidewalls. The low-pressure chamber is substantially medial the hub and the outer ring and can provide pneumatic support if the outer ring collapses and if the outer ring loses pressure. The low-pressure chamber works together with the ring restraint bands and the outer ring stiffness to hold the outer ring concentrically around the wheel hub.

In FIG. 1-6, the wheel product 10 has a low-pressure chamber 28.

Under load, rolling on a smooth surface and with optimal pressures in the both high-pressure chamber and the low-pressure chamber, the ring restraint band holds the stiff, pressurized outer ring substantially concentrically around the wheel hub.

Under load, rolling on a rough surface, and when the wheel product encounters a significant obstruction, the outer ring can collapse inwards due to the flexibility of the chamber, the outer ring, and the ring restraint band. Similarly, pressure loss in the high-pressure chamber can cause the outer ring to collapse inwards.

With the outer ring collapsed, the tire holds the wheel hub away from the rolling surface substantially via the low-pressure chamber maintaining a gap between the wheel hub and the rolling surface.

With the outer ring collapsed, the low-pressure chamber and the stiffness of the outer ring provide outward restoring forces biasing the outer ring to assume the ring-like shape and to hold the outer ring substantially concentrically around the wheel hub.

With the outer ring collapsed, the tire can perform like a conventional pneumatic tire.

The outer ring can have an outward-facing tread. The outward-facing tread can protect the outer ring from contacting directly the rolling surface. The outward-facing tread can provide puncture resistance and wear resistance to the outer ring.

In FIG. 1-6, the outer ring 21 has an outward-facing tread 41.

The outward-facing tread can be removable and replaceable. The outward-facing tread can be connected to the outer ring via various means, including but not limited to adhesive means, sewing means, and various other connection means. The outward-facing tread can be unitarily molded into the outer ring.

The tire can have a porous sidewall restraint band. The porous sidewall restraint band connects the sidewalls together and limits the sidewalls from moving away from each other. The sidewall restraint band can help maintain optimal tire shape by limiting sidewall movement. The sidewall restraint band connects to each sidewall and the band is spaced apart from both the wheel hub and from the outer ring, within the low-pressure chamber.

The sidewall restraint band is porous to prevent pressure gradients across the sidewall restraint band. Except for transient pressure gradients, sidewall restraint band porosity ensures substantially equal pressure across the sidewall restraint band.

The porous sidewall restraint band is strong, flexible, and substantially inelastic. The sidewall restraint band minimally elongates so that the band can significantly limit ring movement radially away from the hub and axially along the hub.

The sidewall restraint band maintains the optimal tire shape by keeping the sidewalls from bulging outwards under load and pressure. The optimal shape can promote maximum tread contact with the rolling surface and minimize sidewall scrubbing on the rolling surface. The narrow shape imposed by the sidewall restraint band can reduce aerodynamic drag caused by the tire.

In FIG. 1-6, the tire 20 has a sidewall restraint band 29.

The sidewall restraint band substantially bisects the low-pressure chamber and is porous so that pressure is substantially equal across the sidewall restraint band.

The sidewall restraint band can intersect a ring restraint band. The sidewall restraint band can be connected to the ring restraint band and can be unitarily formed with the ring restraint band.

The tire can have more than one sidewall restraint band. A sidewall restraint band can intersect another sidewall restraint band. Sidewall restraint bands can be connected via various means and methods including, but not limited to, sewing, adhesive bonding, thermal welding, and others. Multiple sidewall restraint bands can be unitarily formed together.

The wheel product can include a polymer hub protector fixed to the wheel hub. The hub protector encircles the hub within the low-pressure chamber.

The hub protector can protect the hub from damage in the event of significant pressure loss in both the high-pressure chamber and the low-pressure chamber, and when the outer ring has been substantially deformed by road obstructions. After a significant pressure loss and after substantially outer ring deformation, the wheel product can roll on the hub protector without damaging the hub for a limited time.

Additionally, the hub protector absorbs shock in the event of a significant pressure loss and in the event of substantial outer ring deformation. The hub protector can absorb shock by converting energy expended deforming the hub protector into heat.

In FIG. 1-6, the wheel product 10 has a hub protector 51.

The hub protector can have various shapes. The hub protector 51 has a polygonal cross-section. Alternatively, the hub protector can have a curvilinear cross-section, and arbitrarily-shaped cross-section, and combination thereof.

In an embodiment of the invention, the wheel product incorporates an electric hub motor build directly into the wheel hub so that the wheel product provides a self-contained propulsion system. The hub motor embodiment allows for further reduction of drive train components such as a drive shaft, universal joints, CV joints, and various other elements. This embodiment significantly enhances the overall efficiency of the wheel product.

The hub motor comprises an internal stator and a driven, external rotor fixed to the wheel hub. As electromagnetic fields are introduced in the stator, the rotor and the wheel hub follow the fields and drive the wheel hub in rotation around the stator.

The hub motor embodiment of the wheel product includes the multi-chambered pneumatic tire fixed to and rotating with the wheel hub.

In FIG. 1-6, the wheel product 10 has a hub motor built into the wheel hub 34. The hub motor comprises an internal stator 61 and a rotor 62 connected to the wheel hub 34.

Claimed is:

1. A wheel product comprising:
    a multi-chambered pneumatic tire fixed to and rotating with a wheel hub about a wheel axis;
    the tire comprising:
        a hollow non-porous outer ring encircling the wheel hub and being radially spaced apart from the wheel hub;
        the ring comprising:
            at least one high-pressure chamber;
                the at least one high-pressure chamber encircling the wheel hub within the ring;

the ring being restrained radially by a first porous ring restraint band and by a second porous ring restraint band;

the ring being restrained axially by the first porous ring restraint band and by the second porous ring restraint band;

the porous ring restraint bands preventing non-transient pressure gradients across each ring restraint band;

the porous ring restraints being substantially inelastic;

the ring being fixed to the hub by a first non-porous sidewall and by a second non-porous sidewall; and the sidewalls being axially spaced apart and the sidewalls, the ring and the wheel hub enclosing the ring restraint bands within a low pressure chamber.

2. The wheel product of claim 1 wherein the ring restraint bands comprise poly-para-phenylene terephthalamide fibers.

3. The wheel product of claim 1 further comprising:
a polymer hub protector encircling the hub within the low-pressure chamber.

4. The wheel product of claim 2 further comprising:
a polymer hub protector encircling the hub within the low-pressure chamber.

5. A wheel product comprising:
a multi-chambered pneumatic tire fixed to and rotating with a wheel hub about a wheel axis;
the tire comprising:
a hollow non-porous outer ring encircling the wheel hub and being radially spaced apart from the wheel hub;
the ring comprising:
at least one high-pressure chamber;
the at least one high-pressure chamber encircling the wheel hub within the ring;
the ring being restrained radially by a first porous ring restraint band and by a second porous ring restraint band;
the ring being restrained axially by the first porous ring restraint band and by the second porous ring restraint band;
the porous ring restraint bands preventing non-transient pressure gradients across the ring restraint bands;
the porous ring restraints being substantially inelastic;
the ring being fixed to the hub by a first non-porous sidewall and by a second non-porous sidewall; and
the sidewalls being axially spaced apart and the sidewalls, the ring and the wheel hub enclosing the ring restraint bands within a low pressure chamber;
a porous sidewall restraint band connecting the sidewalls medial the hub and the outer ring and within the low pressure chamber;
the porous sidewall restraint band preventing non-transient pressure gradients across the sidewall restraint band; and
the porous sidewall restraint band being substantially inelastic to limit first sidewall movement away from the second sidewall and to limit second sidewall movement away from the first sidewall.

6. The wheel product of claim 5 wherein the ring restraint bands and the sidewall restraint band comprise poly-para-phenylene terephthalamide fibers.

7. The wheel product of claim 5 further comprising:
a polymer hub protector encircling the hub within the low-pressure chamber.

8. The wheel product of claim 6 further comprising:
a polymer hub protector encircling the hub within the low-pressure chamber.

9. A wheel product comprising:
an electric hub motor,
the hub motor having a hub driven in rotation about a motor axis;
a multi-chambered pneumatic tire fixed to and rotating with the hub;
the tire comprising:
a hollow non-porous outer ring encircling the wheel hub and being radially spaced apart from the wheel hub;
the ring comprising:
at least one high-pressure chamber;
the at least one high-pressure chamber encircling the wheel hub within the ring;
the ring being restrained radially by a first porous ring restraint band and by a second porous ring restraint band;
the ring being restrained axially by the first porous ring restraint band and by the second porous ring restraint band;
the porous ring restraint bands preventing non-transient pressure gradients across the ring restraint bands;
the porous ring restraints being substantially inelastic;
the ring being fixed to the hub by a first non-porous sidewall and by a second non-porous sidewall; and
the sidewalls being axially spaced apart and the sidewalls, the ring and the wheel hub enclosing the ring restraint bands within a low pressure chamber.

10. The wheel product of claim 9 wherein the ring restraint bands comprise poly-para-phenylene terephthalamide fibers.

11. The wheel product of claim 9 further comprising:
a polymer hub protector encircling the hub within the low-pressure chamber.

12. The wheel product of claim 10 further comprising:
a polymer hub protector encircling the hub within the low-pressure chamber.

13. A wheel product comprising:
an electric hub motor,
the hub motor having a hub driven in rotation about a motor axis;
a multi-chambered pneumatic tire fixed to and rotating with the hub;
the tire comprising:
a hollow non-porous outer ring encircling the wheel hub and being radially spaced apart from the wheel hub;
the ring comprising:
at least one high-pressure chamber;
the at least one high-pressure chamber encircling the wheel hub within the ring;
the ring being restrained radially by a first porous ring restraint band and by a second porous ring restraint band;
the ring being restrained axially by the first porous ring restraint band and by the second porous ring restraint band;
the porous ring restraint bands preventing non-transient pressure gradients across the ring restraint bands;
the porous ring restraints being substantially inelastic;
the ring being fixed to the hub by a first non-porous sidewall and by a second non-porous sidewall; and the sidewalls being axially spaced apart and the sidewalls, the ring and the wheel hub enclosing the ring restraint bands within a low pressure chamber;

a porous sidewall restraint band connecting the sidewalls medial the hub and the outer ring and within the low pressure chamber;

the porous sidewall restraint band preventing non-transient pressure gradients across the porous sidewall restraint band; and the porous sidewall restraint band being substantially inelastic to limit first sidewall movement away from the second sidewall and to limit second sidewall movement away from the first sidewall.

14. The wheel product of claim 13 wherein the ring restraint bands and the sidewall restraint band comprise poly-para-phenylene terephthalamide fibers.

15. The wheel product of claim 13 further comprising:
a polymer hub protector encircling the hub within the low-pressure chamber.

16. The wheel product of claim 14 further comprising:
a polymer hub protector encircling the hub within the low-pressure chamber.

* * * * *

UNITED STATES PATENT AND TRADEMARK OFFICE
CERTIFICATE OF CORRECTION

| | | |
|---|---|---|
| PATENT NO. | : 7,726,371 B2 | Page 1 of 1 |
| APPLICATION NO. | : 11/769566 | |
| DATED | : June 1, 2010 | |
| INVENTOR(S) | : Glenn A. Morrison | |

It is certified that error appears in the above-identified patent and that said Letters Patent is hereby corrected as shown below:

Column 2, line 19, change "Toriodal" to --Toroidal--

Column 2, line 38, change "toriodal" to --toroidal--

Column 2, line 59, change "band." to --band, and to better withstand shear forces.--

Column 4, line 17, after "together." insert --Ring restraint bands and sidewall restraint bands can comprise poly-para-phenylene terephthalamide fibers.--

Column 4, line 25, change "substantially" to --substantial--

Column 4, line 36, change "and" to --an--

Column 4, line 37, change "and" to --or a--

Column 4, line 39, change "build" to --built--

Signed and Sealed this

Thirty-first Day of August, 2010

David J. Kappos
*Director of the United States Patent and Trademark Office*